United States Patent
David et al.

(10) Patent No.: US 9,244,598 B1
(45) Date of Patent: Jan. 26, 2016

(54) INTERACTIVE CENTERPIECE SYSTEM

(71) Applicants: Christina David, Mt. Sinai, NY (US); Jeffrey Howe, Mt. Sinai, NY (US)

(72) Inventors: Christina David, Mt. Sinai, NY (US); Jeffrey Howe, Mt. Sinai, NY (US)

(*) Notice: Subject to any disclaimer, the term of this patent is extended or adjusted under 35 U.S.C. 154(b) by 521 days.

(21) Appl. No.: 13/785,763

(22) Filed: Mar. 5, 2013

(51) Int. Cl.
*G06F 3/0484* (2013.01)

(52) U.S. Cl.
CPC ................ *G06F 3/0484* (2013.01)

(58) Field of Classification Search
None
See application file for complete search history.

(56) References Cited

U.S. PATENT DOCUMENTS

| | | | | |
|---|---|---|---|---|
| 5,506,009 | A * | 4/1996 | Stolzman | A41G 1/00 248/27.8 |
| 5,508,070 | A * | 4/1996 | DiLapo | A41G 1/00 156/61 |
| 5,683,762 | A * | 11/1997 | Banschick | A01G 5/04 211/13.1 |
| 7,096,623 | B2 * | 8/2006 | Cardamone | A47G 7/07 47/41.01 |
| 7,305,182 | B1 | 12/2007 | Rhyne et al. | |
| 7,562,492 | B2 * | 7/2009 | Mueller | A01G 5/04 47/41.12 |
| 7,832,633 | B2 | 11/2010 | Gordon et al. | |
| 7,835,947 | B2 | 11/2010 | Wolf et al. | |
| 8,212,805 | B1 | 7/2012 | Banschick et al. | |
| 8,364,026 | B2 | 1/2013 | Cheng et al. | |
| 8,392,268 | B2 * | 3/2013 | Smith | G07F 11/54 705/26.1 |
| 2006/0096170 | A1 * | 5/2006 | Wright | A01G 5/04 47/41.01 |
| 2007/0247439 | A1 * | 10/2007 | Daniel | G06F 1/1601 345/173 |
| 2008/0192059 | A1 * | 8/2008 | Kennedy | G06F 3/0488 345/537 |
| 2008/0282608 | A1 * | 11/2008 | Lloyd | A01G 5/04 47/41.01 |
| 2009/0056210 | A1 * | 3/2009 | Fortner | B65D 85/505 47/41.01 |
| 2011/0066494 | A1 * | 3/2011 | Smith | G06Q 30/0251 705/14.49 |
| 2012/0321272 | A1 | 12/2012 | Sikorski | |
| 2013/0058577 | A1 | 3/2013 | Stubler et al. | |

OTHER PUBLICATIONS

Bobgail Special Events, digital photo frame centerpieces, 2012, 1 page, website bobgail.com.
Lulusoso, Wedding centerpieces mini digital photo frame, 2012, 4 pages, website lulusoso.com.

* cited by examiner

*Primary Examiner* — Phenuel Salomon
(74) *Attorney, Agent, or Firm* — Alfred M. Walker

(57) ABSTRACT

An interactive centerpiece system includes a plurality of tablet computers with interactive display devices for displaying slideshows of photograph image data. A substantially flat base with opposing upper and lower surfaces is also provided. The base is formed to lay flat on a table in a table position whereat a base central axis that is perpendicular to both the upper and lower surfaces substantially aligns with a geometric center of the table, to surround a surface area defined by an outer perimeter, about which the plurality of docking stations, into which one of the tablet computers is fixed, are arranged at substantially equal distances from each other. The docking stations are configured to face the interactive display devices outward and define a usable area between the docking stations and the base central axis for uses including receiving traditional event centerpieces.

18 Claims, 18 Drawing Sheets

INTERACTIVE CENTERPIECE SYSTEM

FIELD OF THE INVENTION

The present invention broadly relates to systems and devices for displaying event-captured photographs and videos to guests at the event and, more particularly relates to an interactive media centerpiece system that includes a plurality of tablet computers with interactive display devices mounted on a base positioned centrally so that the interactive display devices face outward from a central part of a table, leaving a space behind the devices for receiving traditional event centerpieces.

BACKGROUND OF THE INVENTION

Systems and devices for photographing and/or video recording events are well known.

For example, U.S. Pat. No. 7,305,182 B1 to Rhyne discloses a process for presenting photographs of an event for inspection, selection and distribution.

After stripping Rhyne '182's claims down to their bare essentials, one is left with something like a dressed up File-Transfer (FTP) website. Fundamentally, Rhyne '182's photographer is able to upload photos to a website, then guests may access this website from their own devices to download digital photos, place orders and possibly provide feedback and e-mail the photos to a friend.

Rhyne '182's electronic notification system provides a "transmission" to guests and sponsors alerting them when photos are posted to a file-transfer website. There is no description in Rhyne, however, of how to collect and organize accurate personal info from hundreds of people within just a few hours.

In Rhyne '182, the photographer "fulfill orders" placed through the website, but there is no claim of monetary transactions, coupons/vouchers or on-site credit card processing, i.e., there is no claim to actually selling or printing photos through the website. Moreover, Rhyne '182 makes a particular effort to ensure that people are NOT paying for photographs through his system, even going so far as to differentiate between the words products and photographs in his 24th claim.

U.S. Pat. No. 8,212,805 B1 of Banschick et al provides users the ability to "design" their own table centerpieces, which are then manufactured and shipped to them. However, this technology does not provide any of the knowledge needed to design a custom display system for use at an event.

Pending US Patent Application Publication number 2012/0321272 of Sikorski, dated Dec. 20, 2012, describes an accessory electronic photo album detachably attached to the front cover of a conventional paper wedding photo album for an event such as a wedding. The electronic photo album proposed by Sikorski permits guests to view still photos and videos of an event at a later date. Sikorski also describes the electronic photo album as having recording capability so that a user can record a greeting to accompany a gift being sent. Sikorski does not describe an interactive media centerpiece for generating, uploading and editing images in situ and in real time at an event with methods for processing payment, editing, printing, sharing or emailing images in situ directly from a tablet computer during an event.

Bob Gail's team have prepared a photo slideshow centerpiece from existing technology (in the form of digital picture frames), and positioned same on the table surface surrounding the centerpiece. The Bob Gail digital photo frames conventionally come with a wide range of capabilities and are made and sold by numerous companies including NIX, Kodak, HP and lulusoso.com. Unfortunately, most models require a power cord and manual updating of the photos on each individual device, and both of these attributes are impractical for this application. Those that might be battery powered only last for 3 to 4 hours at the most and while WiFi capable digital photo frames do exist, they rely on existing WiFi networks to function, so they cannot independently link with the more reliable cellular data or 3G type networks.

SUMMARY OF THE INVENTION

The interactive media slideshow centerpiece of the present invention has a system including one or more of the same controlled by a program operating in a server and method which overcomes the shortcomings of the known art.

An interactive slideshow centerpiece couples the latest modern technologies with the elegance of traditional event décor. The interactive slideshow centerpiece generates a platform, in a form of software, for displaying photographic image data on tablet computers. The physical dimensions of the interactive slideshow centerpiece allow for interaction with the tablet computers, without interference with a layout and functioning of traditional centerpieces at the same table.

The software generates and presents an interactive photo-slideshow so guests may view photos taken during the special event. From this slideshow, guests may select photos and share them with Facebook®, e-mail them to each other or even edit and print pictures that will be available for pickup at the end of the event. Moreover, these interactive centerpieces let guests submit typed messages to the host, which can be presented in the form of a scrapbook following the event.

The interactive slideshow centerpiece functions as a commercial interface through which users interact to edit, print and share photos with particular addressees (for example, via a messaging function) or to various social media websites through the Internet. The interactive slideshow centerpiece also provides for users to leave a message or messages for the host of an event.

Although the interactive slideshow centerpiece can potentially be linked to personal electronic devices, its intended to be supplied by an industry professional for use by event guests.

Therefore, in order to overcome the obstacle of data collection, the interactive slideshow centerpiece has built-in features that allow users to enter their own information when e-mailing, sharing and printing photos. Finally, despite the simplicity of an electronic photo slide show system, there are inherent challenges involved with collecting personal data and such a complex system must be fully defined and understood.

The interactive slideshow centerpiece has a built-in processing system that allows credit card and other payment to be made in exchange for the service of printing of photos.

The interactive slideshow centerpiece, besides its physical structure proximate the center of a table at an event, provides at each display device a centerpiece, a slideshow process or function, a photo editing process or function, a function which enables sharing of photos with other web sites and users (for example, the social media) and recording messages for the host of the event, for example, a bride, a bride's parent, the parent or guardian of adolescent having a sweet 16 party or bar/bat mitzvah.

Rather than simply having a collection of stagnant images, the displays comprising the interactive slideshow centerpiece provide visual and audio cues that engage users' attention and allow users to interact (provide inputs effecting tasks such as editing or sending) with an active slideshow of photos. With or without first editing, a user can select and share (e.g., their favorite) photos with friends, loved ones, social media, etc., without limitation.

The editing and printing options let users customize and change their photos before selecting to print them. After printing, guests may identify their photos by a "nametag" that is added to the photo during the printing process.

This interactive slideshow centerpiece and interactive display devices are quickly assembled to a fixed position, where the outward facing display devices are arranged wagon-train-like about the actual center of the table. The actual center, while surrounded by any number of outward facing display devices (preferably 3), has plenty of room for maintaining a traditional centerpiece. The system is aesthetically pleasing and leaves plenty of room for florists and designers to place their decorative arrangements of flowers and other objects.

The interactive slideshow centerpiece provides optimal viewing angles for the screens, and disassembles quickly into a compact form ready for transport.

In a preferred interactive slideshow centerpiece system, each table shall have one interactive slideshow centerpiece, where each of the separate interactive slideshow centerpieces of each table communicate with the server through WiFi, Bluetooth or satellite communication means, such as for example with 3G or 4G cellular-type Internet capabilities.

Any electronics that are part of the centerpiece need to have wireless internet/networking capabilities, and must have an internal battery capable of lasting at least 6 to 7 hours.

Furthermore, the software controlling the slideshow also controls standard functions such as editing, printing, messaging (email) and sharing photos, for example, with social media web sites.

The software accepts payment and coupons.

For example, if a person sees a photo they like, they will then be inclined to pay attention to the object displaying it, i.e., a display of the interactive slideshow centerpiece. The dynamic nature of the slideshow (a presentation of a sequence of images) causes people to touch the screen. In the inventive interactive slideshow centerpiece, touching any display surface triggers a display function that presents a functional menu to the user, allowing selection of a photo to edit, share, e-mail, print, etc.

Within the interactive process are several other crucial parts of the interactive slideshow centerpiece. Due to the expense associated with printing, it is reckless to allow unregulated printing of pictures during events. To solve this dilemma, the software requires the user to enter payment information or a valid coupon code prior to printing.

Interestingly, people often overlook the value of coupons, but in this case they can be sold as a "party favor package" to the host of the event and dispersed to the guests. This coupon-marketing opens up a huge opportunity for the interactive centerpiece to engage in the party favor market as well as the centerpiece market.

An identification tab is created by the interactive slideshow centerpiece as part of the printed photo to enable a person's name to be displayed without interfering aesthetically with the presentation of the photo.

DESCRIPTION OF THE DRAWING FIGURES

Aspects of the disclosed technology will become apparent upon reading the following detailed description and upon reference to the accompanying drawings in which, like references may indicate similar elements:

Figure 5A:
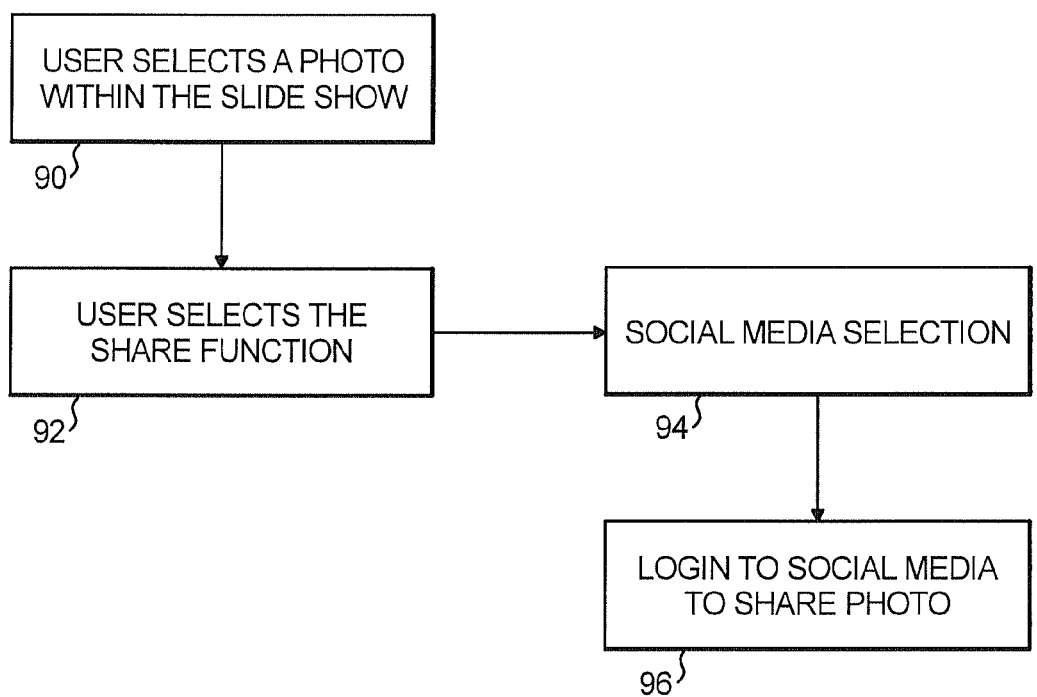
FIG. 5A depicts the process flow for implementing a sharing of the photographs or video data according to the invention.
Figure 5B:
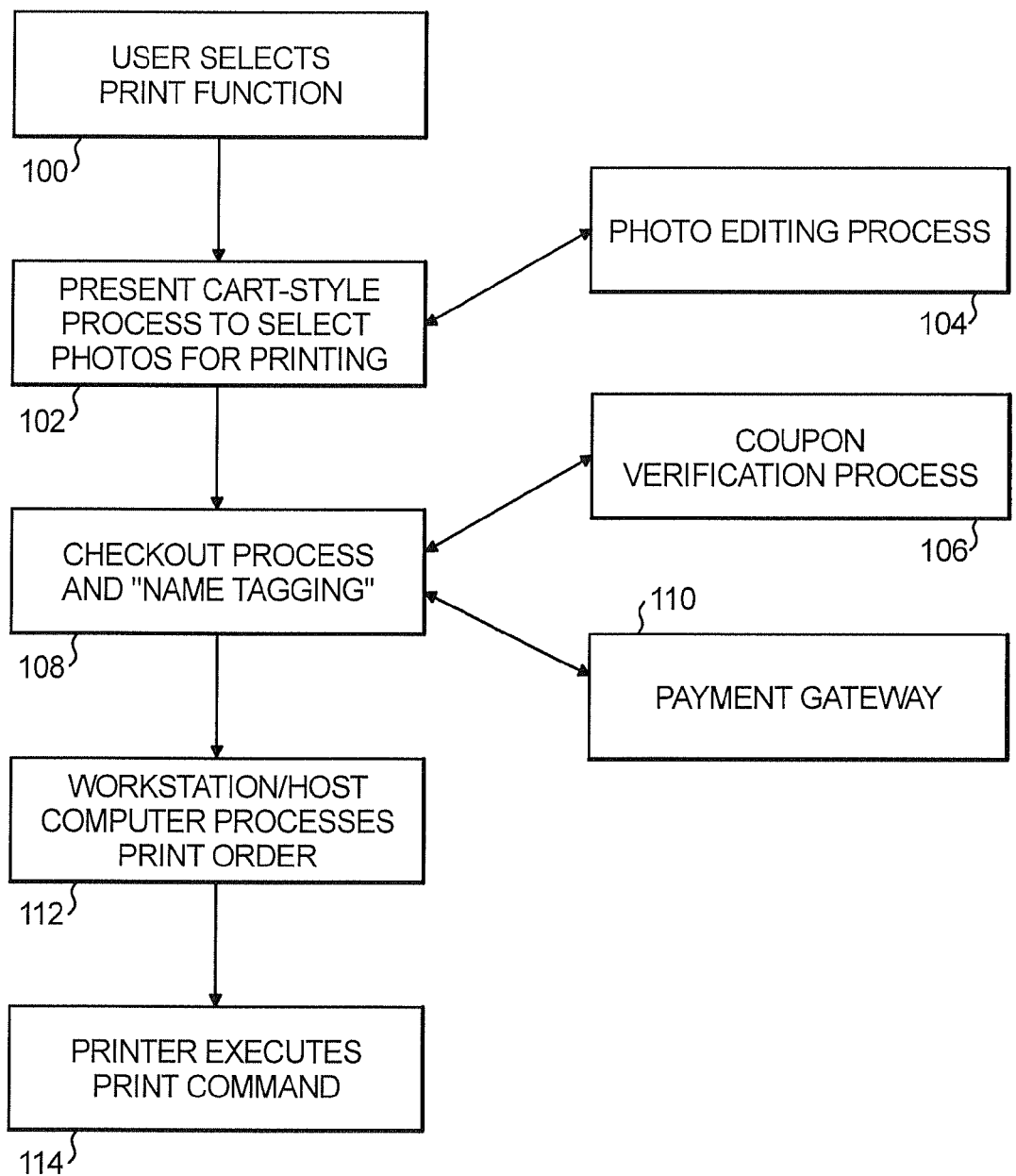
FIG. 5B depicts the process flow for implementing a printing process of the photographs or video data according to the invention.
Figure 5C:
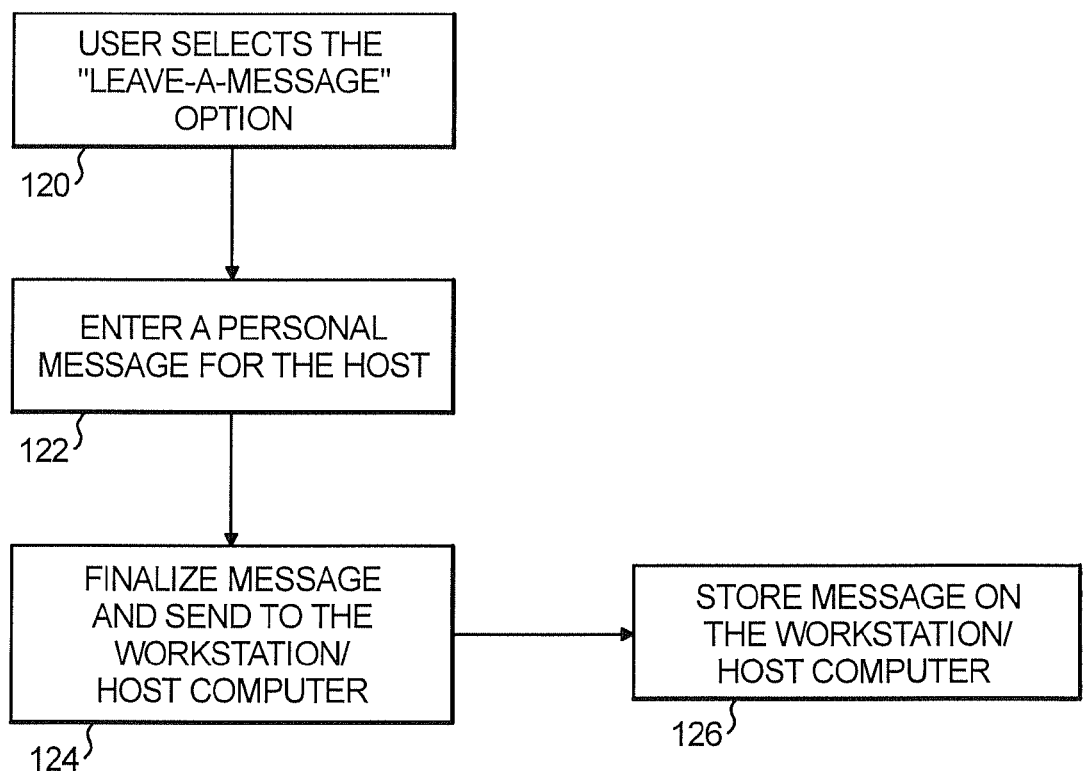
FIG. 5C depicts the process flow for implementing a messaging process according to the invention.
Figure 5D:
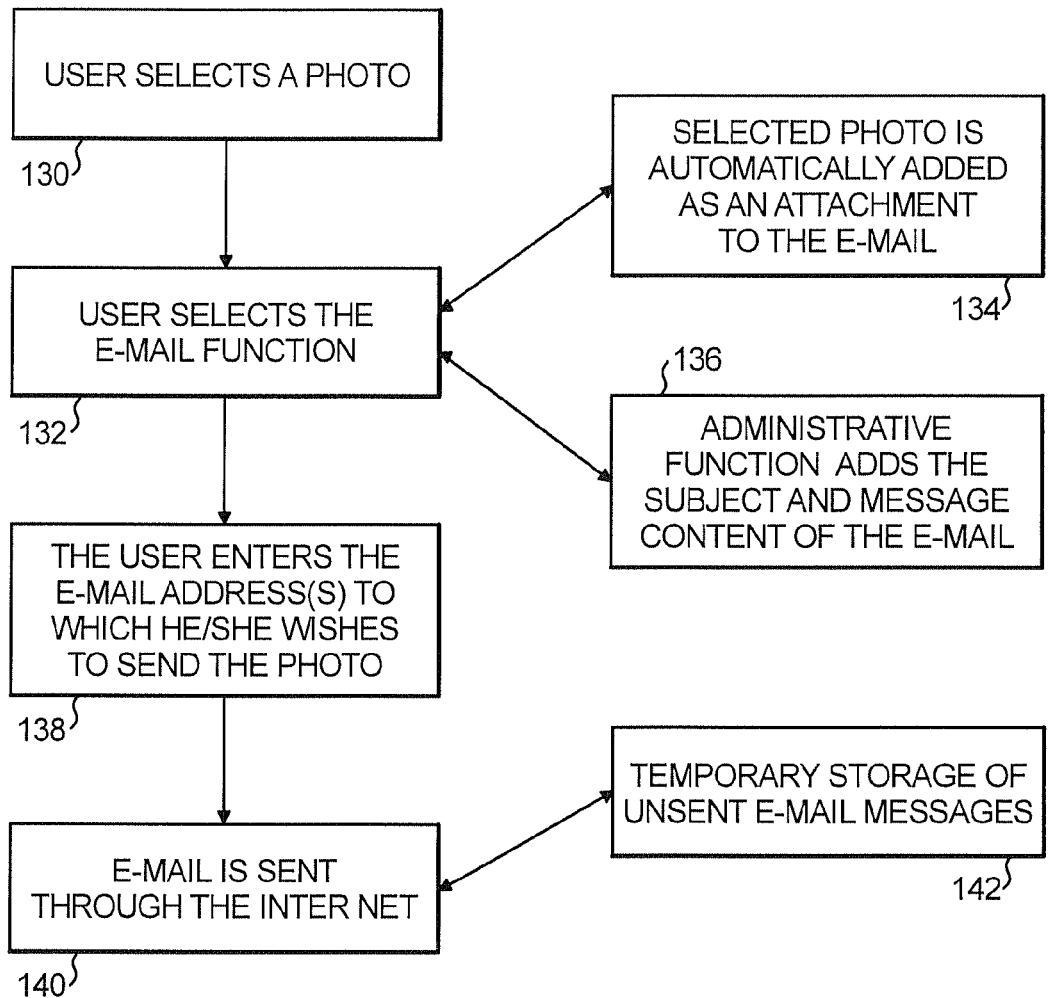
FIG. 5D depicts the process flow for implementing an emailing process according to the invention.
Figure 5E:
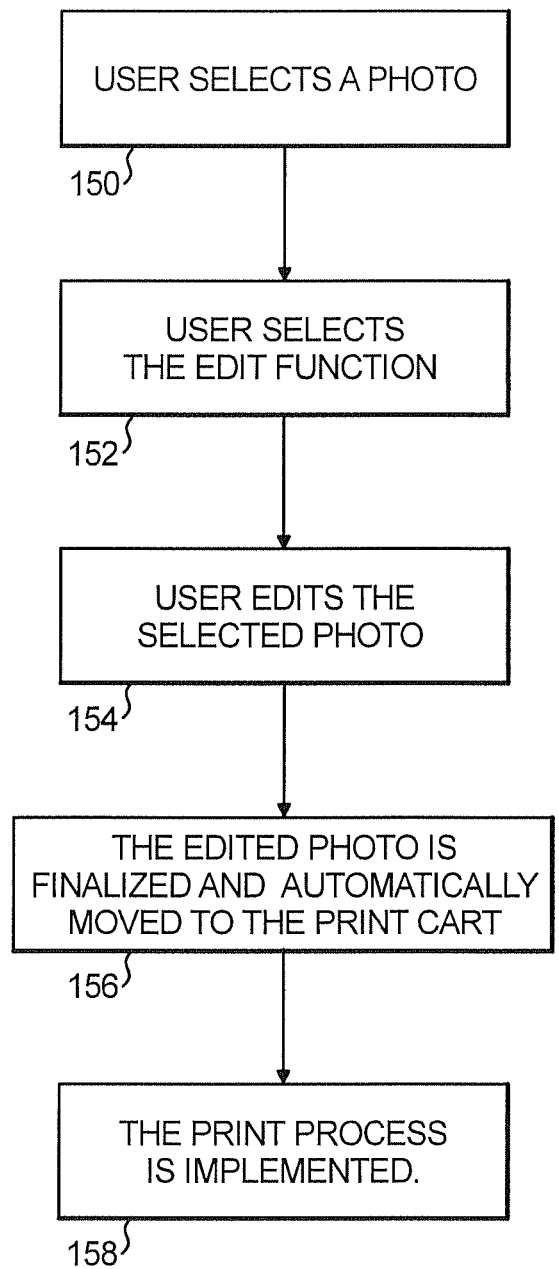
FIG. 5E depicts the process flow for implementing an editing process according to the invention.
Figure 5F:
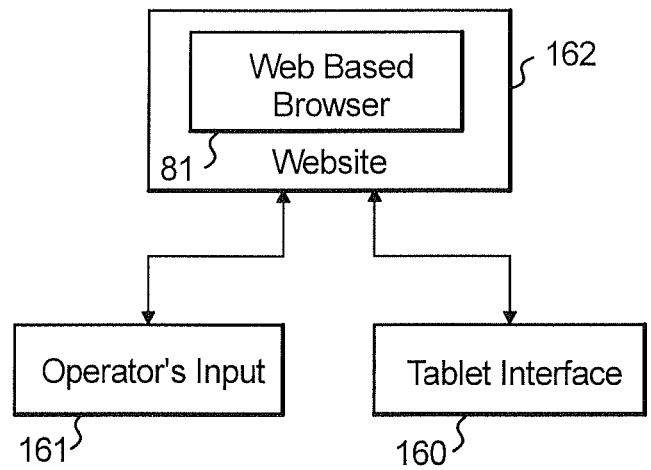
FIG. 5F depicts the process flow for monitoring and starting video and other presentations through the web browser, as in FIG. 4A.
Figure 5G:
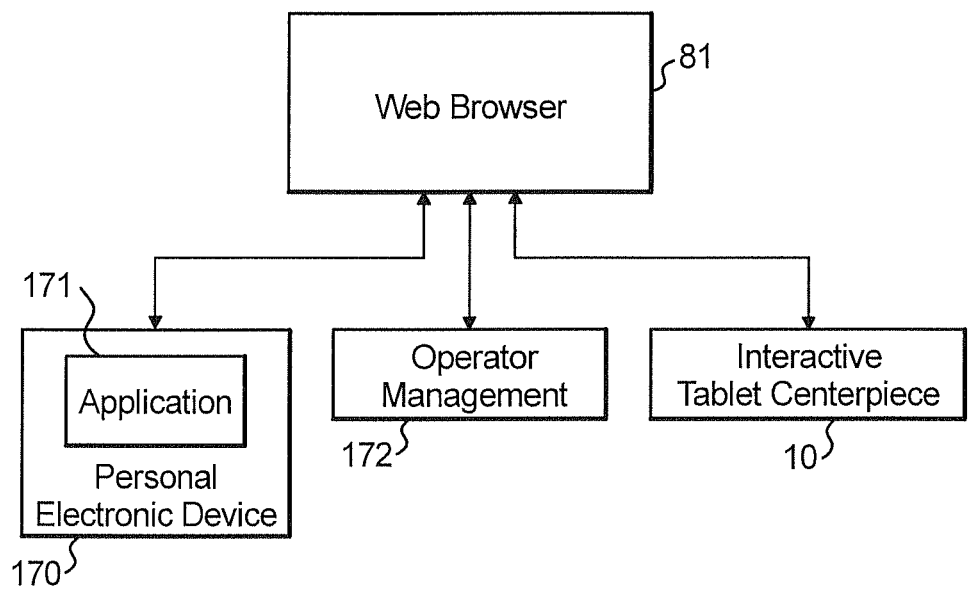
FIG. 5G depicts the process flow for optional on site management of the flow of information between the web browser and the guest's personal electronic devices.
Figure 5H:
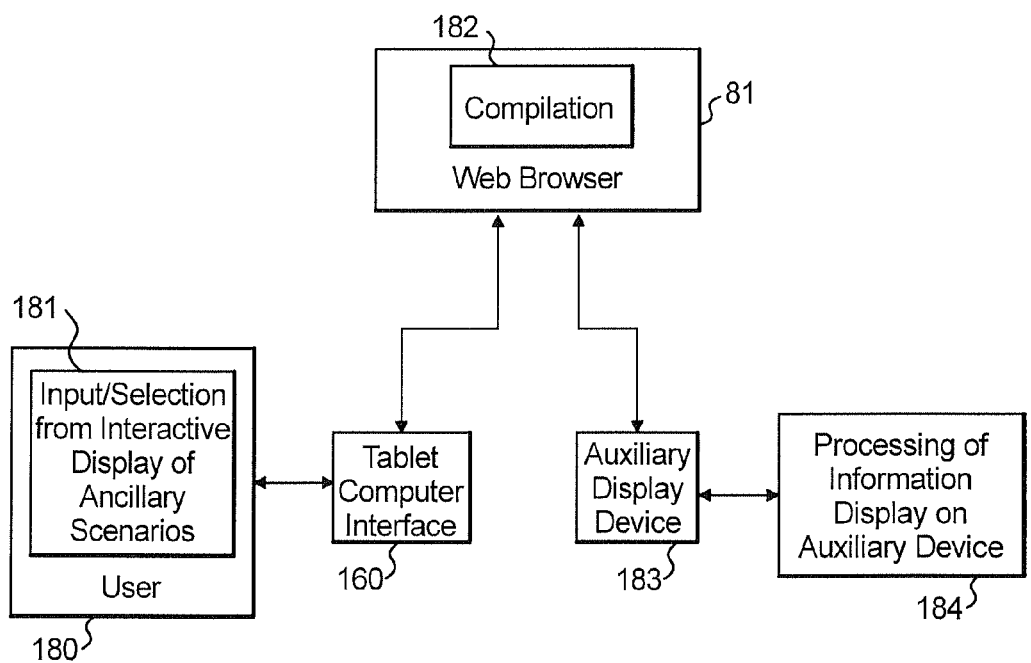
Figure 6:
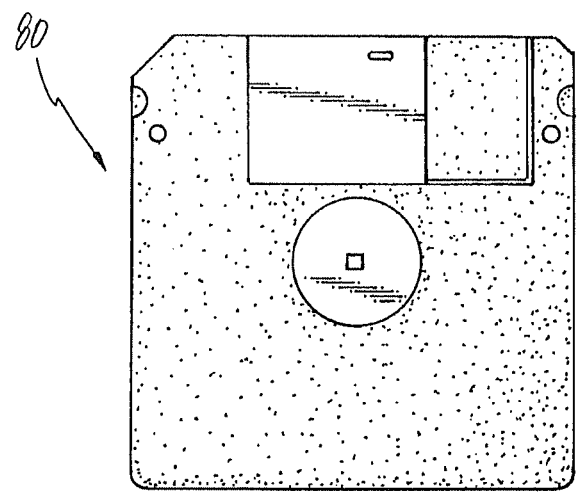
Figure 7:
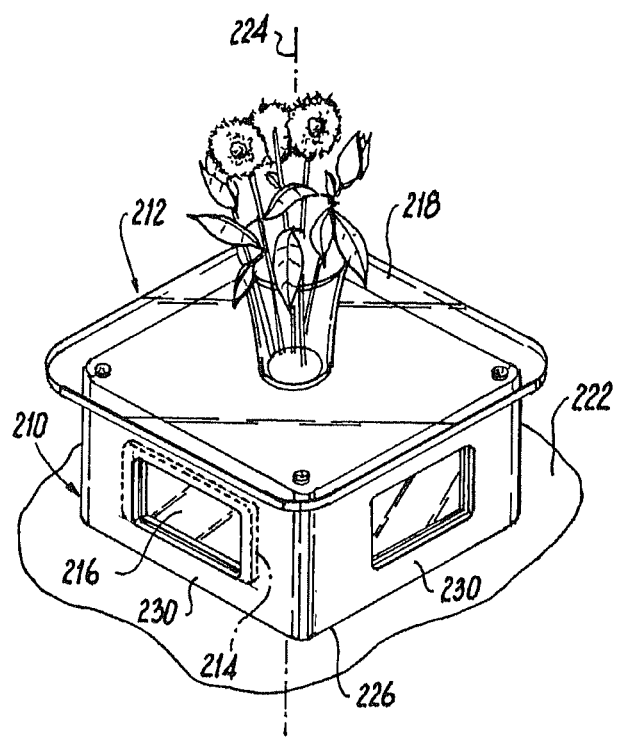
Figure 8:
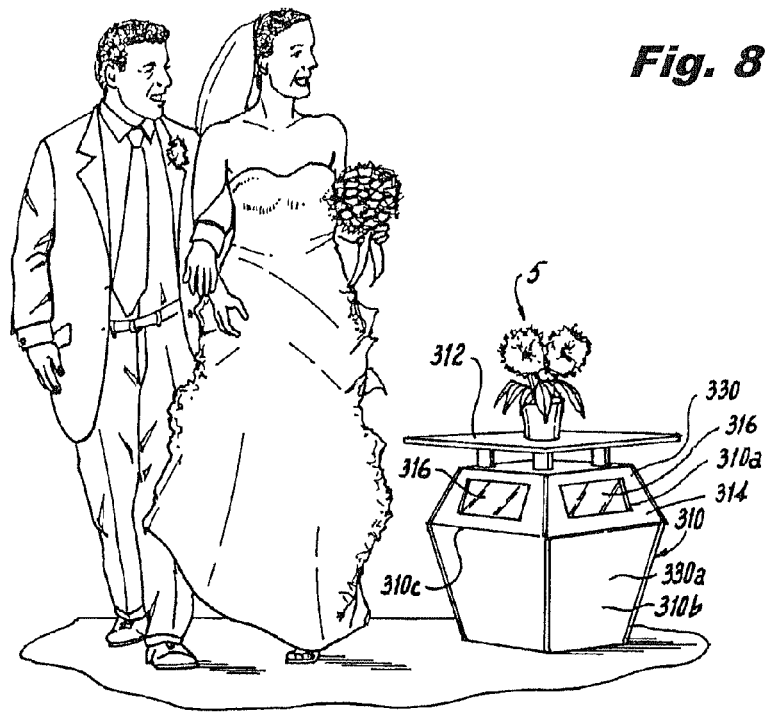
Figure 9:
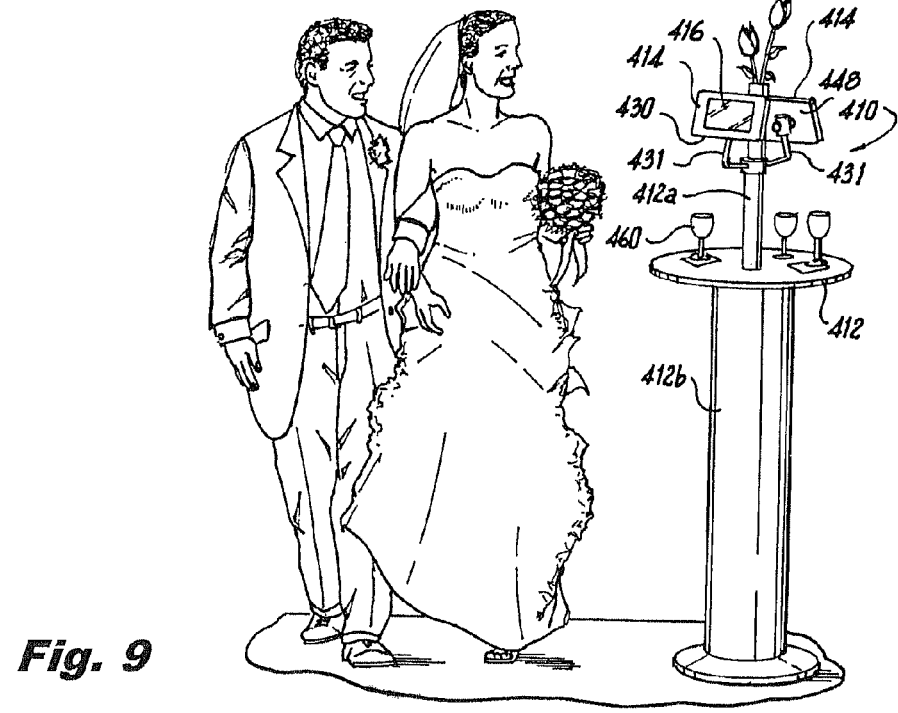

FIG. 5H depicts the process flow for on site management of alternate ancillary options for interacting with the interactive centerpiece, such as for presenting interactive menus for beverage drinks and food at the event, and for ordering and receiving beverage and food orders therefrom, as well as for requesting music to be played at the event. and for coordinating other guest's requests, such as valet transportation services and any other ancillary services relating to the event;

FIG. 6 is a memory storage media for use with the invention;

FIG. 7 is an alternate embodiment of integral centerpiece boxes with embedded interactive displays;

FIG. 8 is an alternate embodiment of an integral centerpiece box with embedded interactive displays; and, FIG. 9. Is an alternate embodiment with interactive displays mounted upon a pedestal with a table support for glasses, cups and dishes.

DETAILED DESCRIPTION OF THE INVENTION

The following is a detailed description of example embodiments of the disclosed technology depicted in the accompanying drawings. The example embodiments are in such detail as to clearly communicate the disclosed technology. However, the amount of detail offered is not intended to limit the anticipated variations of embodiments. On the contrary, the intention is to cover all modifications, equivalents, and alternatives falling within the spirit and scope of the invention, as defined by the appended claims. The descriptions below are designed to make such embodiments obvious to a person of ordinary skill in the art.

The interactive slide show centerpiece 10 comprises two main components: the base 12, and the housing which comprises one or more docking stations 14 for supporting tablet computers 16 thereat. The base 12 is preferably made from a solid material, such as plastic or polyvinyl and is approximately ½" thick. The base covers a usable area of a standard centerpiece on the table surface. On any table the dining-ware consumes approximately 16-18" of space from the edge. Therefore, on a 5' wide table the centerpiece 10 would be 2' wide, and on a 6' table the centerpiece would be 3' wide, etc. The tablet computer displays 16 are located on the outer edge of the centerpiece 10 so that they are always roughly 18" from the edge of the table. This keeps them within a comfortable "arms-reach" for guests. Once the base 12 is positioned on a table proximate the table center, preferably so that the base center aligns with the table center, the docking stations 14 for the tablet computers 16 are secured to the base 12.

Having the docking stations 14 to receive 2, 3 or 4 tablet computers 16 with interactive display devices in a single base unit creates a physically strong system. For that matter, the base 12 may be locked to the table and the tablet computers 16 with interactive display devices locked to the base 12.

The interactive slideshow media centerpiece 10 so constructed leaves plenty of room for traditional floral and décor arrangements 5 to be set on top of the interactive slideshow centerpiece 10's base 12 system, or in a central region of the interactive slideshow centerpiece 10's base 12 system. This space left for traditional arrangements 5 gives others the freedom to design around the interactive centerpiece 10, and the additional weight on top of the base 12 will serve to further stabilize the display system of the interactive centerpiece 10.

Figure 1:
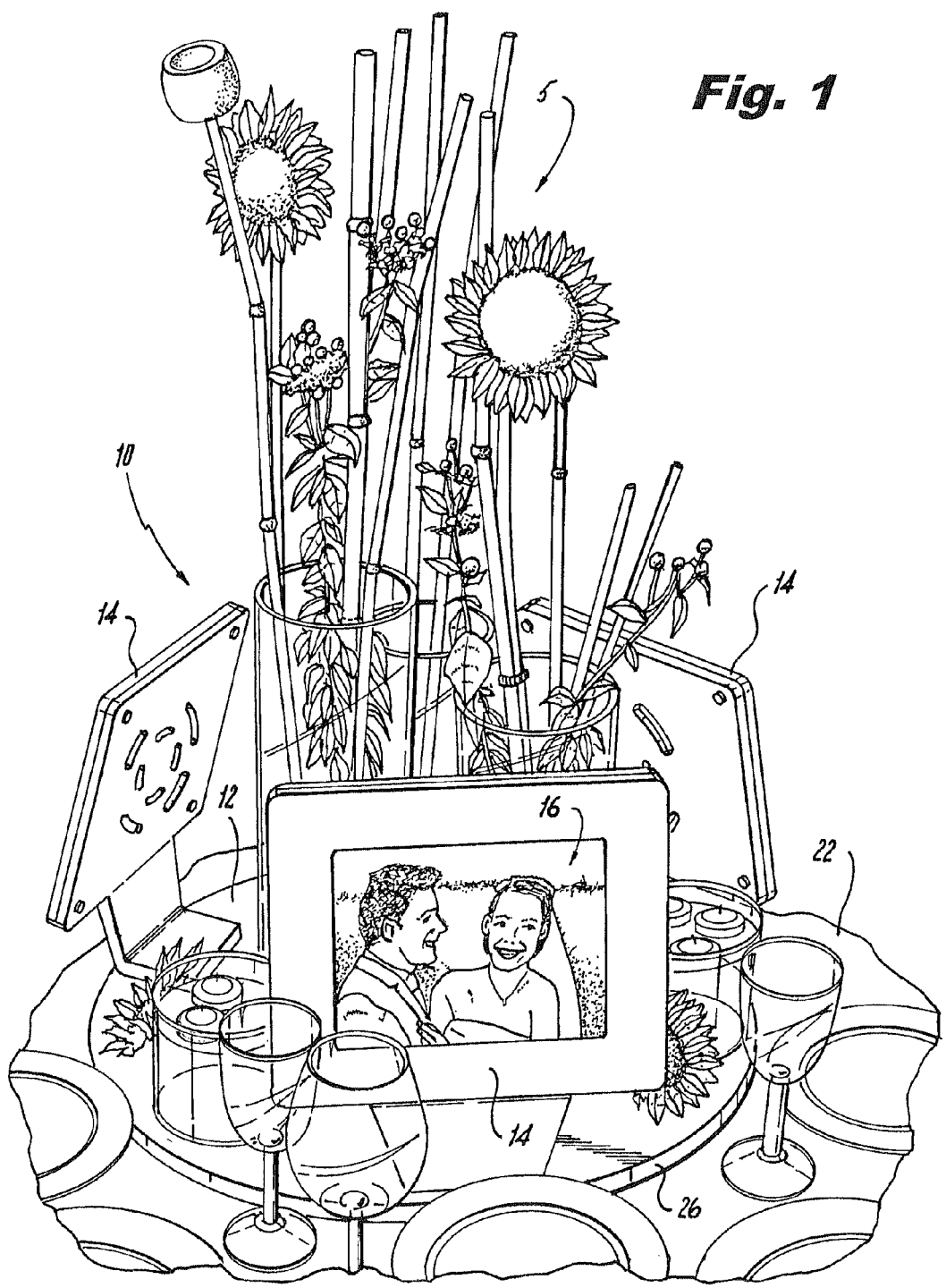
FIG. 1 depicts one embodiment of an interactive slideshow centerpiece device, of the invention.

The tablet computer 16 is ideal for its battery power and wireless networking capabilities. For that matter, in an "open center" layout as depicted in FIG. 1 (described in greater detail below), all of the components, including the docking stations 14, bolt down. Part of the beauty of the "open center" design is that traditional décor and floral components 5 can be displayed almost without interference from the interactive displays of the tablet computers 16.

Figure 2:
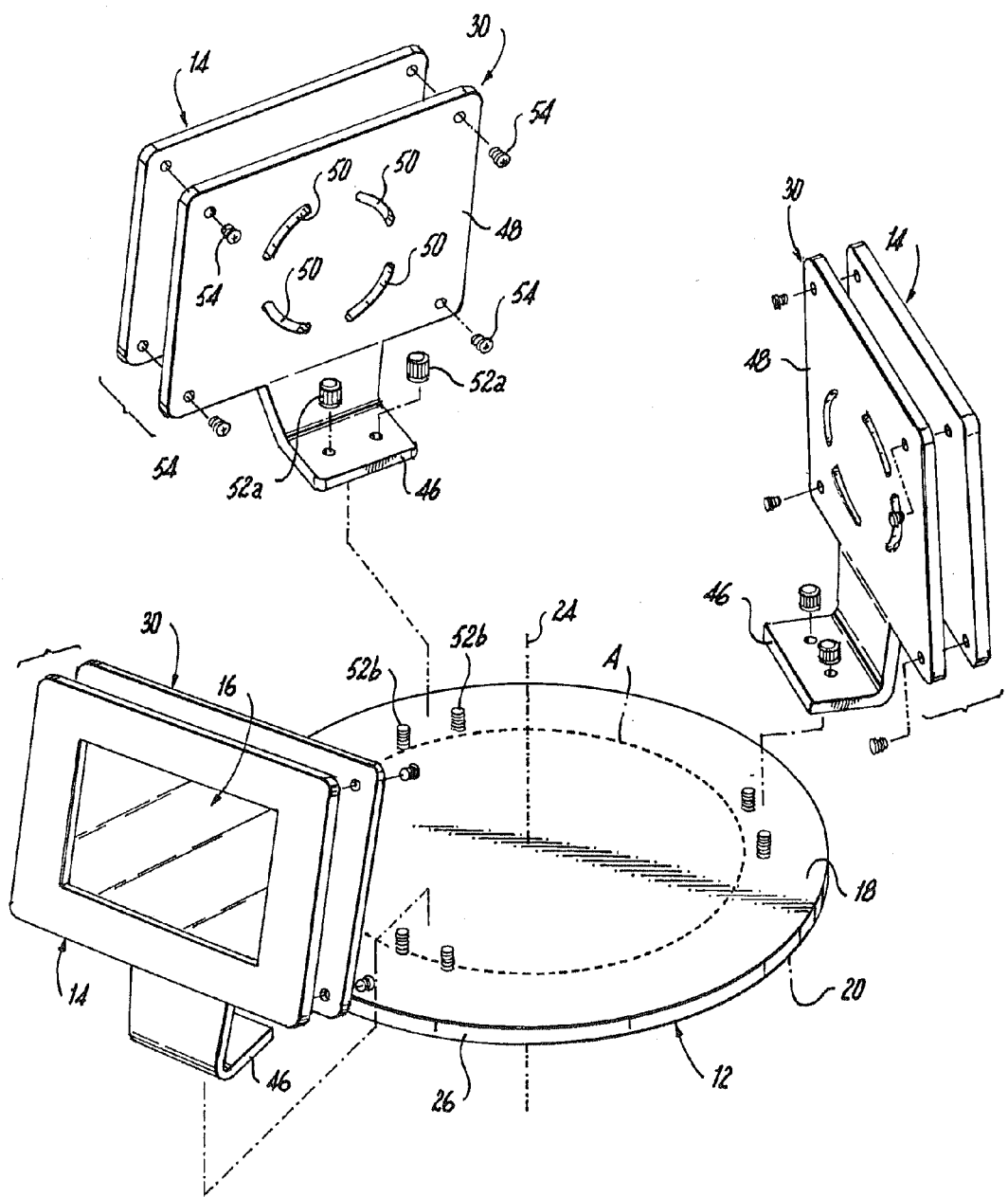
FIG. 2 depicts the interactive slideshow centerpiece device of FIG. 1 in greater detail.
Figure 2A:
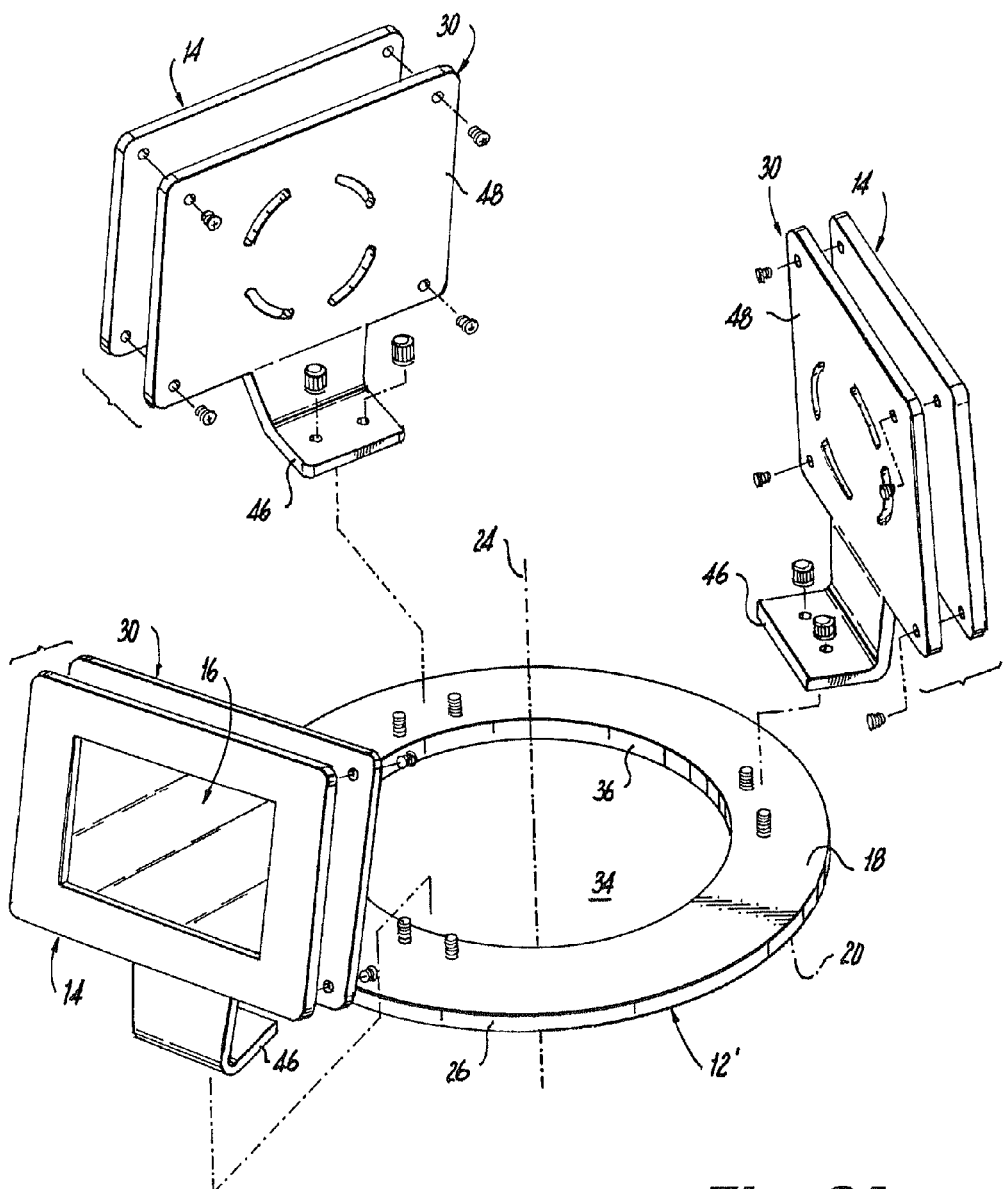
FIG. 2a depicts an alternative embodiment of the interactive slideshow centerpiece device of FIGS. 1 and 2.
Figure 2B:
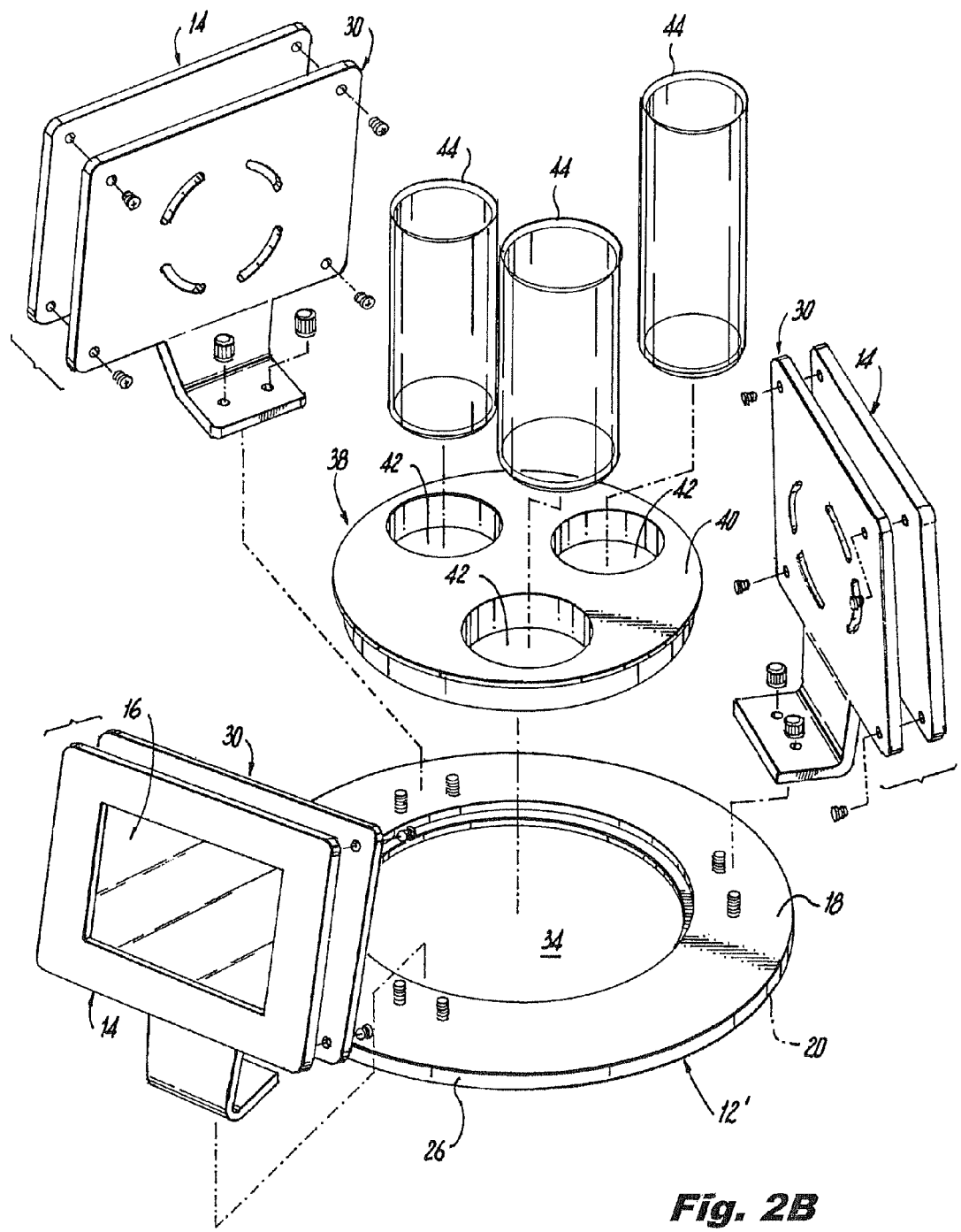
FIG. 2b depicts an alternative embodiment of the interactive slideshow centerpiece device.
Figure 2C:
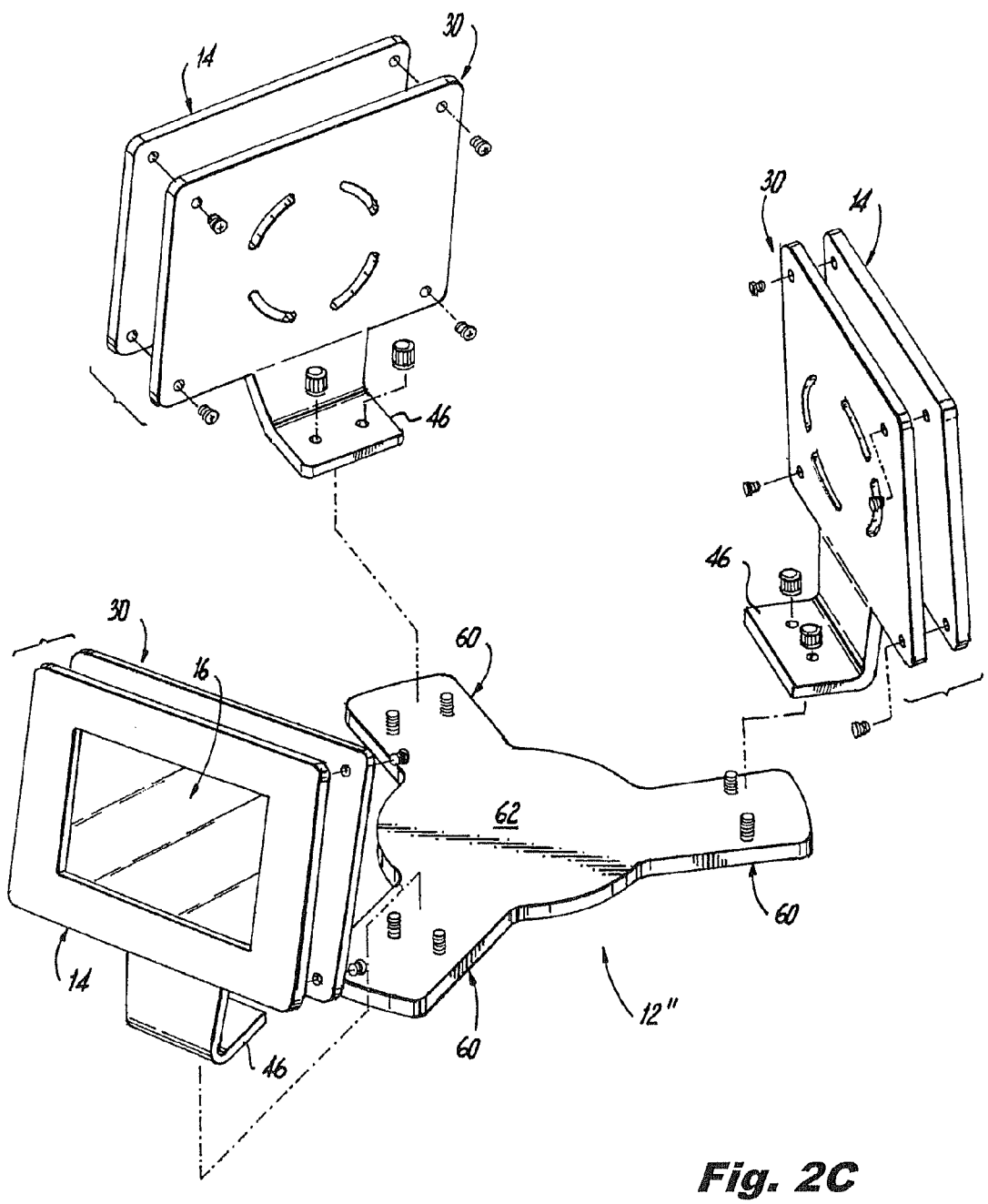
FIG. 2c depicts an alternative embodiment of the interactive slideshow centerpiece device.
Figure 2D:
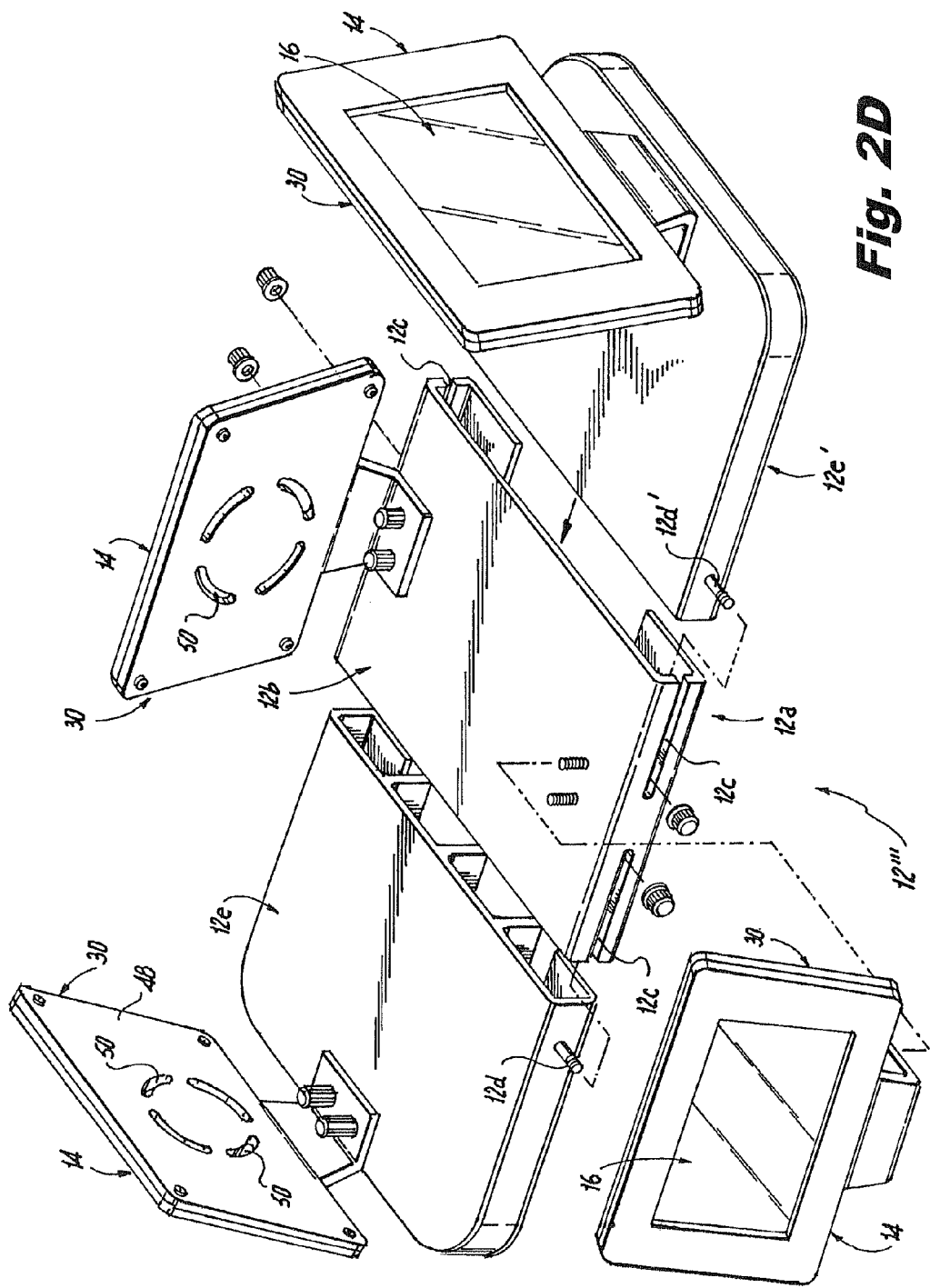
FIG. 2d depicts an alternative embodiment of the interactive slideshow centerpiece device with an adjustable sized base.
Figure 3:
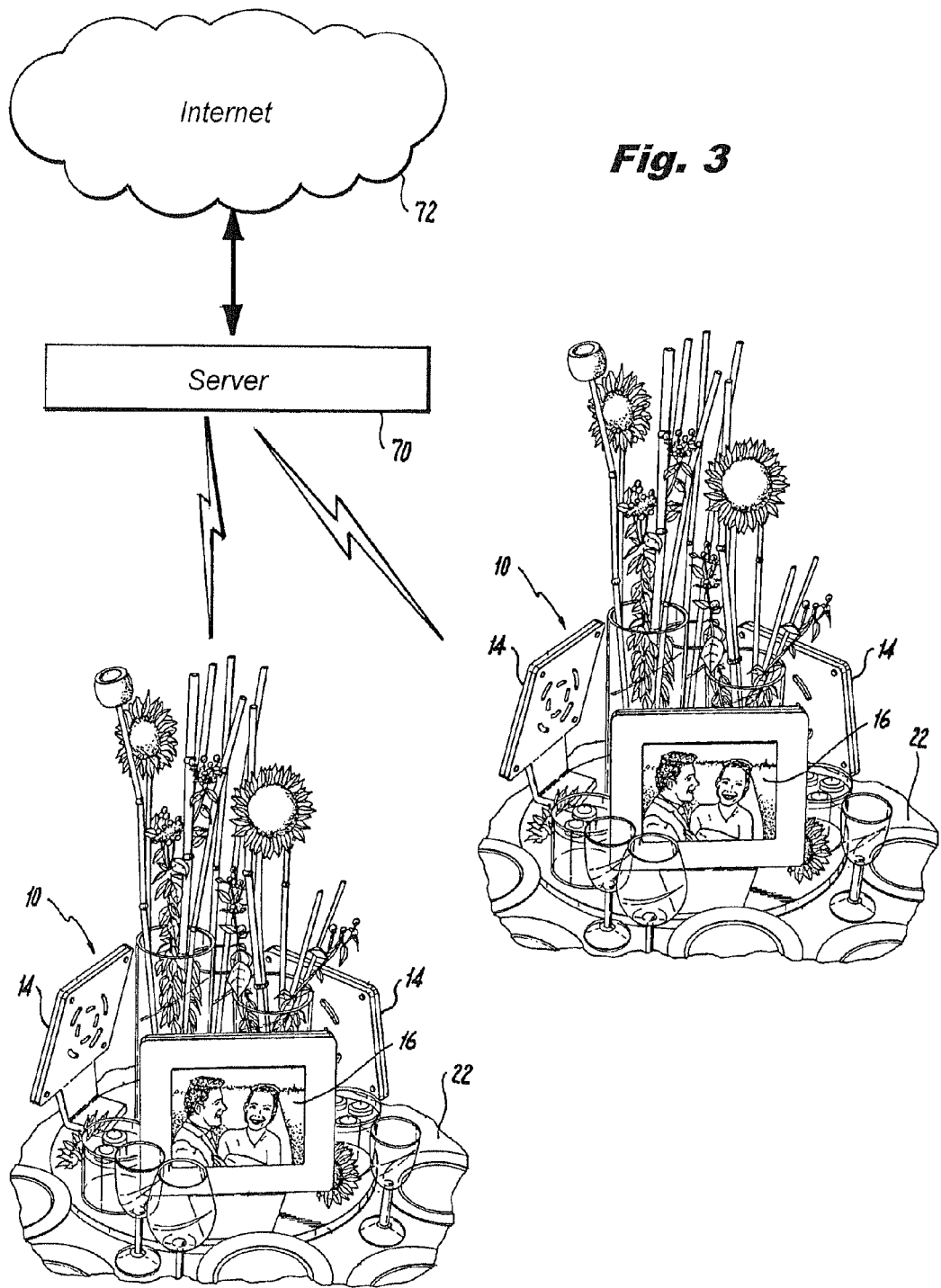
FIG. 3 depicts an interactive centerpiece system of the invention.

FIGS. 1 and 2 display an embodiment of an interactive slideshow centerpiece device 10, which is part of an interactive centerpiece system (see FIG. 3). Slideshow centerpiece 10 comprises a plurality of docking stations 14 retaining interactive display devices such as hand-held tablet computers 16 with touch screen displays, for displaying slideshows of photographic image data. The slideshow centerpiece 10 also includes a substantially flat base 12 with opposing upper 18 and lower 20 surfaces. Frame portions 14 extend upward from base 12 in a preferably "wagon train" array equally spaced around the center axis 24 of base 12. While three docking stations 14 are shown in FIGS. 2, 2a, 2b and 2c, other quantities may be provided, such as four docking stations shown in FIG. 2d supporting four tablet computers 16. The base 12 is formed to lay flat on a table 22 in a table position, whereas base central axis 24 is perpendicular to both the upper and lower surfaces and substantially aligns with a geometric center of the table 22, to surround a surface area (equivalent, for example, to a surface area of upper surface 18 as shown) defined by an outer perimeter 26, about which the plurality of docking stations 14, functioning as tablet support frames 30, into which each one of the tablet computers 16 is fixed or docked. The docking stations 14 and, therefore, the tablet computers 16, are arranged at substantially equal distances from each other about the outer perimeter (proximate edge 26).

The docking stations 14 are configured as tablet support frames 30 that receive the tablet computers 16. The docking stations 14 are fixed to the base 12 in positions about the outer perimeter, whereby upon insertion of tablet computers 16 with the interactive display devices, the docking stations 14 face outward from the base central axis 24, defining a usable area between the docking stations 14 and the base central axis for uses including receiving traditional event centerpieces 5. For example, in FIG. 2, the usable area is that part of the surface 18 between dashed radial line A and the base central axis 24.

The outer perimeter of the base is defined as any of the shapes of the group consisting of circular (as in drawing FIG. 2), square, rectangular, oval, ring-like, as in FIGS. 2a and 2b, and disc-like with radially-extending wings (as in drawing FIG. 2c).

FIGS. 2a and 2b depict embodiments where the base 12' is ring-like. In the embodiments shown, there is no base material in a circular surface area 34 defined between an inner ring boundary 36 and the base central axis 24. Preferably, a centerpiece fixture 38 is included that is configured to be positioned in the circular surface area 34. The centerpiece fixture 38 includes a disc-like base 40 with recesses 42 configured for receiving containers 44.

The docking stations 14 comprise pedestals 46 that include support frames 30 with rear support plates 48. As shown, rear support plates 48 include openings 50 which vent any heat that might emanate from a tablet computer 16, when fixed to a support frame 30 of a docking station 14. The docking stations 14 preferably utilize fasteners, such as connectors 52a, to form a friction connection with complementary machined bolts 52b extending out of surface 18 of base 12. Machine screws 54 preferably affix the tablet computers 16 to the frame portions 30 of docking stations 14. The reader should note that the connectors are merely shown for exemplary purposes, where the invention contemplates the use of any fastening mechanism for mechanically connecting a pedestal 46 to base 12, 12', 12" and connecting a tablet computer 16 to support frames 30 of docking stations 14.

FIG. 2c presents an embodiment where the base 12" includes a disc like section from which extend radially extending wings 60 at which docking stations 14 with frame portions 30 are connected, leaving a usable area 62.

FIG. 2d depicts an inventive embodiment where base 12''' include means for adjusting the outer perimeter and, therefore, the usable area, such as a base 12a including a central leaf 12b with slots 12c accommodating external nibs 12d and 12d' extending from opposite base wings 12e and 12e' to increase or decrease the length of base 12a supporting docking stations 14, which support interactive table computers 16, thereby adjusting the surface area of the base and, therefore, the size of the usable area.

Preferably, the bases 12, 12', 12" are defined by an arrangement of 3 docking stations arranged at 0 degrees, at 120 degrees and at 240 degrees, made of plastic or polyvinyl and the tablet computers 16 are Apple iPads®, for example.

The tablet computers 16 receive and present photographic or video images with or without audio sounds, such as speech or music, as a slideshow and respond to users' inputs and commands for processing photos presented in the slideshow, including video and/or audio, transmitting the photos and any processed photos, video and/or audio realized by processing the photos, video and/or audio. To that end, the tablet computer 16 comprises interactive display devices that not only present photo, audio and video outputs but receive user input data for processing. The tablet computers 16 communicate wirelessly to a server 70, as shown in the system of the invention depicted in FIG. 3.

Server 70 also is in communication with the Internet 72 via a communication function, program or device (not shown) and server 70 enables communications by the tablet computers 16. The link to the Internet may be hard wired or wireless. Users may access a tablet computer 16 to insert commands to process any particular photograph, video, video segment, audio segment, etc., captured at the event and downloaded as a slideshow to tablet computers 16. The server 70 runs a computer program that implements the controls. That is, the server 70 controls the display devices of the tablet computers 16, to present display images and/or sounds, with fields configured for entering user data and configured for delivering event data, or event organizer data to the users.

The server 70 also operates to allow users to order photographs or sets of photographs, for processing photographs or sets of photographs or otherwise for communicating with an event organizer, photographer or videographer. The slideshows of photographic image data may also optionally comprise video and/or audio.

Figure 4:
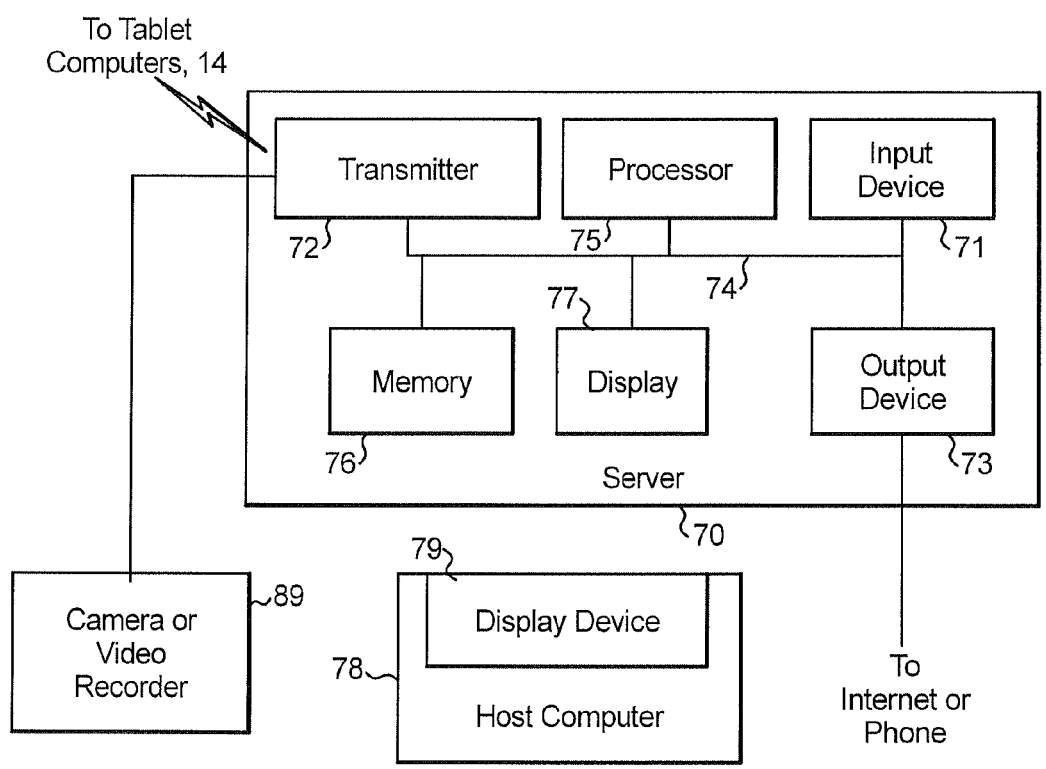
FIG. 4 depicts a server that is programmed to function according to a method of the invention.

FIG. 4 presents a simplified block diagram of a one embodiment of server 70. Server 70 include an input device 71 such as a mouse, keyboard, USB connector/port, pen device, etc., as a transmitter 72 to wirelessly transmit and receive communications, including video, audio and photographic data, to and from the tablet computers 16 and, to transmit commands to and receive still and moving image and audio data from a camera of video recording device 89. Output device or function 73 connects the server 70 to the Internet or satellite phone system, as known to those of ordinary skill in the art. Conventional bus 74 connects the transmitter 72, the input device 71 and the output device 73 to a processor 75, a memory device 76, a display device 77 (including an audio component not shown).

The processor 75 may include a special purpose processor configured to perform the processes described herein. In another embodiment, the processor 75 is a general purpose processor configured to execute computer executable instructions (e.g., stored in the memory device 76) to perform the processes described herein. In addition, or in other embodiments, the processor 75 may be connected to a host computer 78 having a display device 79. The host computer 78 may include computer executable instructions for performing the processes described herein. The host computer 78 may be used in certain embodiments.

Figure 4A:
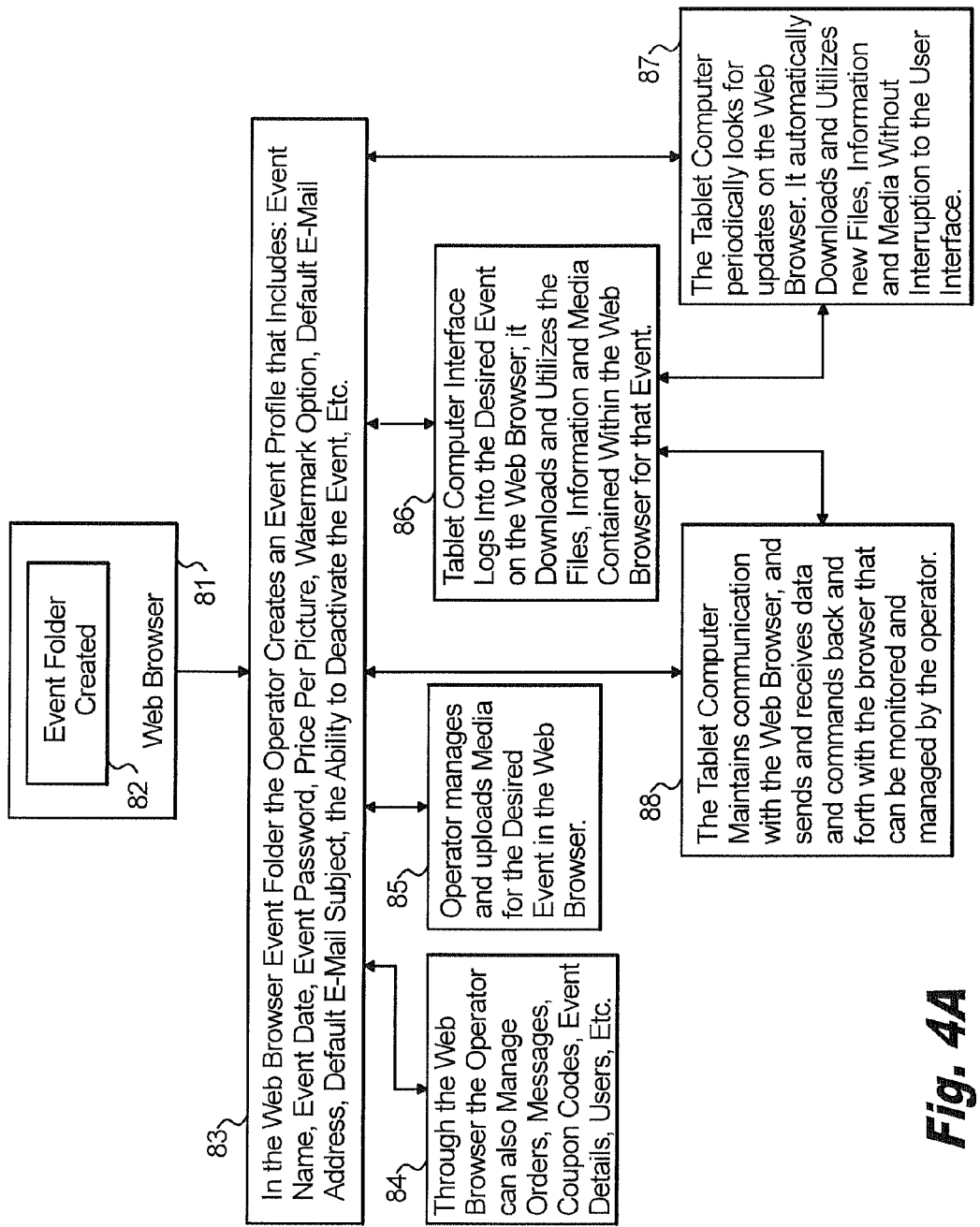
FIG. 4A depicts a management system for a web-based browser used with the interactive centerpieces, according to a method of the invention.

As shown in FIG. 4A, the management software is based off a web-browser 81 that links into the specific computer application (i.e. "app") on each tablet computer 16 device. In the web-browser 81 there are individual events created and the operator uploads photos, video and/or audio to their desired event. When the centerpieces 10 are setup at the event they are logged into the corresponding event on the browser 81. The app downloads all photographic, video and/or audio material from the browser 81 and displays it as a slideshow on the screen of each tablet computer 16. The data that passes through each tablet computer device 16 logs on the web browser 81 so that the person overseeing each event can login and view a list of any information sent from the tablet computer 16 (email, print commands, messages, etc.)

As also shown in FIG. 4A, in this information management process, the operator behind the scenes controls the information going to the tablet interface by utilizing a web-based browser 81, which is a software program that allows the user to find and read encoded documents, in a form suitable for display upon tablet computers 16, in conjunction with the Internet.

As also shown in FIG. 4A, by setting up individual event folders 82 and profiles 83 for each event that is happening, the operator can successfully manage each event separate from the others. The event profiles 83 contain specific information for that event and the "event name" and "password" created therein are the same that the tablet computer 16 uses to access that information. Much of the information defined within the event profile 83 reflects on the customizable features of the interactive media centerpiece 10, such as the price per photo, e-mail address that the photos are being sent from, etc.

FIG. 4A also depicts that, through this browser 81, the operator of the interactive centerpiece 10 can also view and monitor the transactions and messaging taking place through the tablet computer 16's interface 84. This monitoring of the messaging is achieved by having two-way communication between the tablet computers 16 and the web browser 81.

Further with respect to FIG. 4A, the web browser 81 is also where the operator uploads all media 85 that will appear on the interactive centerpiece 10. This media 85 includes photos as well as video and audio. There is a system for triggering videos and presentations on the tablet computers 16, with cues sent from the web browser 81 to the interactive centerpiece 10.

In order to generate the interactive media on the tablet computers 16 of the interactive centerpiece 10, it must be logged by a logging step 86 into the appropriate event 82 on the web browser 81, as shown in FIG. 4A. Once logged in, the tablet computer 16 downloads all the information, files and media under that selected event and prepares it accordingly (normally this is accomplished by sorting the photos into an interactive slideshow).

Pursuant to FIG. 4A, throughout the event, (for example: as new photos are uploaded to the web browser 81 during the event) the tablet computer 16 updates itself in an automatic updating step 87, with any new changes to the information, files and media for the event 82 which the tablet computer 16 is logged into.

Also, as described in FIG. 4A, during the event 82, information 88 is sent back to the web browser 81 from the tablet computer 16. This information 88 includes a status list of print orders being processed for copies of photographs or other media, e-mails being sent, messages being left, and many other pieces of useful information.

Lastly, as further disclosed in FIG. 4A, there is a system of the interactive centerpiece for the user to be able to take photos and videos of themselves through the tablet computer 16 of the interactive centerpiece 10, and this media 85 is then sent back to the web browser 81, to be monitored before it is incorporated into the slideshow, etc. being viewable upon tablet computers 16 of interactive centerpiece 10.

Other potential capabilities of the interactive media centerpiece 10 include taking photos, capturing video clips, processing song requests, processing drink and food orders or offering interactive catering menus.

A different aspect of the invention includes a computer-implemented method for carrying operating the inventive system. As an example, this method may be implemented in the particular environment discussed above, for example, by operating a controller of a computer controller, as embodied by a digital data processing device, to execute a sequence of machine-readable instructions. These instructions may reside in various types of storage media, either in the server 70 or in the case where a portion of the code is loaded down to control the tablet computers 16.

The method of the present invention embodies a number of computer instructions, that when executed by the server or at least in part by a tablet computer 16, send captured image data in a stream or slideshow to the tablet computers 16. The method controls the display and the display screens presented to the users accessing the photographs, video and/or audio data, as explained above. The method manages each user's account, including billing, passwords, etc.

The method provides a sharing function, as shown in FIG. 5A. In a first step (90), the user selects a photo within a slideshow. In a step (92), the user selects the share function from the interactive display screen of the respective tablet computer. In step (94), the user is presented via the display device at least three (3) different types of social media to choose from such as Facebook® and Twitter®, or other interactive social media outlets. In step (96), the user logs into the external social program. Server 70 routes the communications.

The method also provides a print process, as shown in FIG. 5B.

In a first step (step 100), the interactive display device is controlled to allow a user to select a print function. In a step (102), the interactive display device presents a cart-style process to select photos or other graphic media for printing. In a step (104), the interactive display device allows a user to edit a photo selected previously using a photo editing process implemented by the inventive system and process. In a step (106), the display device presents screens for implementing a coupon verification process and in a step (108) presents screens for implementing a checkout process and Name Tagging. In step (110), a user is enabled to access a payment gateway, such as PAYPAL or other payment institution, and in step (112), a workstation/host computer processes print orders. In a step (114), the printer executes the print command. While the term "print" generally means physically printing a photographic image onto photographic paper, it is also contemplated that "printing" may also encompass printing onto a souvenir, such as a take home coffee mug. "Printing" may also encompass embedding downloaded video and/or audio, down onto a tangible media, such as a portable flash drive, diskette or other media capturing device.

The method also provides a message process, as shown in FIG. 5C. In a step (120), a display device presents, and the user selects, the "LEAVE-A-MESSAGE" option. Then, in a step (122), a display screen is presented that allows the user to enter a personal message for the host of the event. Then, in a step (124), the message is finalized and sent to the workstation/host computer. Then, in a step 126, the message is stored on the workstation/host computer.

The method also provides an email process, as shown in FIG. 5D. In a step (130), the display device interacts with the user to enable selection of a photograph (photo) or other image or audio. In a step (132), the user is presented with display images enabling selection of the email function. In step (134), the selected photo is automatically added as an attachment to the email and in a step (136), an administrative function is operated to add a subject and a message content of the email. In a step (138), the display device presents data that requests the user to enter email addresses to which he/she wishes to send the photo(s) or other image or audio. In step (140), the email is sent (via the server) and in step (142), any unsent email messages are temporarily stored locally.

The method also provides an editing process, as shown in FIG. 5E. In a step (150), the display device interacts with the user to enable selection of a photograph or photo (or other image or audio). In a step (152), the display device interacts with the user to enable selection of an edit function. In a step (154), the display device interacts with the user to enable the user to edit the selected photo or photos or other images or audio. In step (156), the edited photo, image or audio is finalized and automatically moved to the print cart and in a step (158), the print process is implemented.

As shown in FIG. 5F, the method also provides a management process for triggering video and other presentations through the web based browser 81, shown in FIG. 4A, and for remote control of internal settings on each tablet computer 16, such as brightness, volume, standby mode, etc.

For example, at the beginning of each event 82 such as disclosed in FIG. 4A, the tablet computer 16's interface 160 logs in and downloads all the files, information and media contained within the designated event folder 82 on the web browser 81, as is also shown in FIG. 5F. Depending on the requirements of the event, the interactive slide show preferably continues as normal and the video and other presentation files remain on "standby" in the background. These "standby" videos remain unseen until they are triggered by the operator 161 in the web based browser 81. Once a selected sequence (for example, a movie, Power Point slide, etc.) is triggered in the web browser 81, a message is sent to each tablet computer 16, instructing it to open that selected file and let it run to completion. Once the movie or presentation is completed, the slideshow may resume as normal. Additionally, the use of time is used as a trigger for playing videos. For example, the video will play when a clock hits a specific time.

An alternate embodiment of this video and presentation display system similar to that of FIG. 5F involves the media playing through the web based browser 81, which is also displayed on the tablet computer 16's interfaces 160. First, the operator 161 uploads the video or other media to a designated website 160 affiliated with web browser 81. Second, the tablet computer 16's interface 160 syncs with the website 162 of web browser 81 and displays any media that is uploaded to that management site. The operator controls the video and slideshow directly on the website 162 and essentially puts on a live Internet based "show" that plays through the tablet computer 16's interface 160.

As shown in FIG. 5G, on site management optionally manages the flow of information between the web browser 81 of FIG. 4A and the guest's personal electronic device 170, such as a hand held smartphone or handheld personal electronic tablet.

For example, as disclosed in FIG. 5G, similar to the interactive computer tablet 16's displays used for the interactive centerpieces 10, a guest's personal portable electronic device 170 can also be logged into the event folder 82 within the web browser 81, such as shown in FIG. 4A. Like the tablet computer 16 of interactive centerpiece 10, the guest's handheld portable electronic device 170 has full interactive capabilities, and the guest essentially has a mini-centerpiece on his or her portable "phone".

As further shown in FIG. 5G, when the interactive centerpiece's downloadable "app" 171 currently on a guest's personal electronic device 170 is logged into an event 82, it behaves substantially the same as each of the interactive centerpieces 10 do, and networks with the web browser 81 in the same way, as shown in FIG. 4A. Importantly, a guest may use their phone or other hand held portable electronic device 170 to take pictures and other media that are then automatically uploaded to the web browser 81 where they can be monitored 172 before being incorporated into the event 82 specified on the web browser 81. Once these uploaded photos, videos, etc. are approved they will be utilized in the event 82 and displayed on the guest's personal portable electronic devices 171 or on the tablet computers 16 of the interactive centerpiece 10, in the same way as any other media disclosed in FIG. 4A (i.e. photos are incorporated into the interactive slideshow, etc. of the interactive centerpiece 10).

As shown in FIG. 5H, on site management optionally manages alternate ancillary options for guests interacting with the interactive centerpiece 10, such as by presenting interactive menus for the food at the event, and by ordering and receiving beverage and food orders therefrom, as well as for requesting music to be played at the event. and for coordinating other guest's requests, such as valet transportation services and any other ancillary services relating to the event.

For example, as shown in FIG. 5H, using the example of an ancillary service 181, such as an interactive menu (which can be interchangeable with songs, and other forms of interactive selection systems) a guest user 180 views and interacts with the interactive menu portion 181 of the computer tablet 16's display system. Upon deciding what the guest likes (food or beverage drinks both apply to this) the guest user 180 makes his or her selection and adds any necessary custom options (such as no ice) and submits his or her order with the respective name, table number, etc. If the guest user 180 selects an alcoholic beverage, there will be a system for checking their age identification ID, either manually or through the interactive device to ensure the guest user 180 is over the age of 21. This requested service order related to a selected ancillary service 181 is then sent via interface 160 (shown in FIG. 4A) from the tablet computer 16 to the web browser 81, where it is compiled in a compilation 182 that makes it easy to display on one or more auxiliary behind the scenes event devices 183, such as in the kitchen for processing food and drink requests 181. The auxiliary device 183 is typically contained in the kitchen or near the bar (or in the case of songs it would be near the DJ) and preferably has all pertinent information regarding the order 181 displayed on the behind the scene auxiliary device 183. The easy presentation of this requested order information 181 makes it easy for the order to be processed in processing step 184 and made ready for that particular guest, who made the ancillary request order 181. Once the order 181 is fulfilled, the operator of the auxiliary display device 183, (who fulfills the guest user 180's requested ancillary order 181) has the ability to mark the order 181 as completed, so that the operator of the auxiliary device 183 can proceed to the next order 181 of a different guest user 180.

Thus, these aspects of the present invention, as shown in FIGS. 4, 4A and 5A-5H, are directed to a programmed product, comprising memory storage media 80 (FIG. 6) tangibly embodying a program or set of machine-readable instructions executable by the hardware described above, to perform the method of the invention.

This storage media may include, for example, a RAM contained within the tablet computers 16 or server 70 (processor 75) as represented by the fast-access storage, for example. Alternatively, the instructions may be contained in another storage media, such as a USB travel drive, directly or indirectly accessible by the tablet computers 16 or server 70. Whether contained in the USB travel drive, the tablet computers 16 or server 70, or elsewhere, the instructions may be stored on a variety of machine-readable data storage media, as known to a person of ordinary skill in the art.

The instructions also may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape). Other suitable signal-bearing media include memory devices in transmission media and instructions stored in formats such as digital and analog and memory devices in communication links and wireless. In an illustrative embodiment of the invention, the machine-readable instructions may comprise software object code. It should also be obvious to one of ordinary skill in the art that the technique of the present invention could be implemented on a network in a variety of configurations.

Hence, the invention includes a computer program product including a processor and a set of processor readable instructions that when executed by the processor execute the method of the present invention.

In another embodiment, the invention includes an interactive slideshow system that enables users to create a personal database from images or audio captured at an event. The users interact with display devices of the respective tablet computers 16 to identify various photographs, video or audio that the user wishes to have post-event access to. The user may also use the photo-shop functions provided to the tablet computers 16 by the server 70 or host 79, and store their edited photographs, videos or audio in their database. Ownership rights and access to databases in a users' name is implemented by the platform at server 70, as known to the skilled artisan.

The system includes the computer server 70 in communication with an image input device 89, for example, camera or video recorder, one or more interactive slideshow centerpiece devices 10 (FIG. 2) for positioning at one or more respective tables at the event location. The interactive slideshow centerpiece devices 10 include a plurality of tablet computers 16 with interactive display devices for displaying slide shows of photographic or video image data or audio data, in electrical communication with the computer server 70 and a substantially flat base 12 with opposing upper and lower surfaces.

The base 12 is formed to lay flat on a table in a table position whereat, a base central axis 24, that is perpendicular to both the upper and lower surfaces, substantially aligns with a geometric center of the table, to surround a surface area defined by an outer perimeter, about which the plurality of docking stations 14, into which one of the tablet computers 16 is fixed, are arranged at substantially equal distances from each other.

The docking stations 14 are configured to face the interactive display devices of tablet computers 16 outward towards the guests at the table, and define a usable area between the docking stations 14 and the base central axis area for uses including receiving traditional event centerpieces 5. The computer server 70 drives the interactive display devices of the tablet computers 16 to present the slideshows and receive users' inputs to process slideshow data therein and allow the users to communicate the slideshow data and processed slideshow data to other electronic devices.

The outer perimeter is formed as a circular area defined by a radial distance to the base central axis 24 of the base 12. The tablet computers 16 present interactive display data that enables users to photo-edit the photographic images made available by the slideshow. The computer server 70 may optionally create a personal account for each user. Users may also chase to change between full-screen and thumbnail viewing of photos on tablet computers 16.

In the alternate embodiment shown in FIG. 7, the centerpiece 210 is an integral box which includes a base 212 on a top edge for supporting decorative vases on top. Integral centerpiece box 210 is an integral three-dimensional triangular, rectangular or cubic box (such as shown in FIG. 7), with distinct upwardly extending docking station walls 230 having the tablet computers 216 with touch screen viewing displays embedded therein.

FIG. 7 also displays an embodiment of an interactive slideshow centerpiece box device 210, which is part of an interactive centerpiece system. Slideshow centerpiece box 210 also comprises a plurality of tablet computers 216 with interactive display devices for displaying slideshows of photographic image data. The upper support base 212 of slideshow centerpiece box 210 also is a substantially flat base 212. The base 212 is formed to lay flat on top of integral centerpiece box 210 on a table 222 in a table position whereat a base central axis 224 that is perpendicular to both the upper and lower surfaces of integral centerpiece box 210 substantially aligns with a geometric center of the table 222, to surround a surface area defined by an outer perimeter 226 of integral centerpiece box 210, about which the plurality of upwardly extending docking stations walls 230, functioning as tablet support frames, into which each one of the tablet computers 216 is fixed or docked. The upwardly extending docking station walls 230 and, therefore, the tablet computers 216 with display screens, are arranged at substantially equal distances from each other about the outer perimeter walls 230 of integral centerpiece box 210.

The docking stations 214 are configured as tablet support frame walls 230 that receive the tablet computers 216. The docking station walls 230 are fixed to the integral centerpiece box 210 and also fixed at respective upper edges to upper vase supporting base 212 in positions about the outer perimeter whereby upon insertion of tablet computers 216, with the interactive display screens, face outward from the base central axis 224, defining a usable area between the docking station walls 230 and the base central axis 224 for uses including receiving traditional event centerpieces, such as decorative floral vases and flowers 5 shown in FIG. 1. For example, in FIG. 1, the usable area is that part of the surface 218 of upper base 212 around the base central axis 224.

While upper base 212 is shown as square, it is contemplated that it may other geometric shapes of the group consisting of circular, square, rectangular, oval, ring-like and disc-like with radially-extending wings.

While FIG. 7 shows an cubic box shaped embodiment for centerpiece box 210 with four upwardly extending walls 230, each having a tablet display 216 embedded therein, in a triangular box (not shown) having a triangular cross section when viewed from above, three upwardly extending surfaces each have a tablet display 216. Elongating the sides of a four sided box from a cube such as integral centerpiece box 210 to a rectangular box with a pair of elongated side walls permits more than four display tablets to be displayed in the rectangular centerpiece box (not shown). Moreover, base 212 further includes means for adjusting the outer perimeter of the base 212 (such as described in FIG. 2*d*), and, therefore, the usable area of the base 212 in an expanded size, when the integral centerpiece box 210 has elongated rectangular sides (not shown) and therefore a larger top surface area.

Therefore, FIG. 7 discloses an alternate embodiment, the integral interactive centerpiece system, comprises:

an integral centerpiece box 210 having a plurality of upwardly extending docking station side walls 230;

a plurality of tablet computers 216 with interactive display devices for displaying slideshows of photographic image data;

at least one of the plurality of tablet computers 216 is embedded in a respective docking station wall 230 of the plurality of upwardly extending docking station side walls 230 of the integral centerpiece box 210; and a substantially flat base 212 is located on top of the integral centerpiece box 210, the base 212 formed to lay flat on the top of the integral centerpiece box 210;

the integral centerpiece box 210 is formed to lay flat on a table in a table position whereat a base central axis 224 that is perpendicular to the base 212 substantially aligns with a geometric center of the table to surround a surface area defined by an outer perimeter 226 about which the plurality of docking station walls 230, into which one of the tablet computers 216 is fixed, are arranged at substantially equal distances from each other;

wherein the docking station walls 230 are configured to face the interactive display devices of the tablet computers 216 outward and define a usable area on top of the integral centerpiece box 210 between the docking station walls 230 and the base central axis 224 for uses including receiving traditional event centerpieces, such as floral displays 5 shown in FIG. 1 herein.

The base 212 of the embodiment of FIG. 7 further includes means for adjusting the outer perimeter and, therefore, the usable area.

In this further embodiment of FIG. 7, the outer perimeter of the base 212 on top of the integral centerpiece box 210 is defined as any of the shapes of the group consisting of circular, square, rectangular, oval, ring-like and disc-like with radially-extending wings.

The base 212 can be ring-like where there is no base material in a circular surface area defined between an inner ring boundary and the base central axis 224.

In this embodiment of FIG. 7, a traditional centerpiece fixture with floral arrangements, is configured to be positioned in the above noted circular surface area of the ring-like shaped base 212.

The tablet computers 216 can be any handheld personal electronic tablet, such as, for example, an Apple® iPad® or other similar devices, made by other manufacturers, such as Blackberry®, Microsoft®, Samsung®, Hewlett Packard®, Dell®, Amazon® Kindle®, Barnes & Noble® Nook® and Motorola® Android®, among others.

While other materials may be employed in the construction of the integral centerpiece box 210, preferably the integral centerpiece box 210 and base 212 are made of plastic or polyvinyl.

In the embodiment of FIG. 7, and as shown in FIGS. 3, 4, 5A, 5B, 5C, 5D, 5E and 6 herein, the tablet computers 214 also receive and present photographic images through screens 216, as a slideshow and respond to users inputs and commands for processing photos presented in the slideshow, including transmitting the photos and any processed photos realized by processing the photos.

The tablet computers 214 also are in electronic communication with a server 70 shown in FIGS. 3, 4, 5A, 5B, 5C, 5D, 5E and 6 herein, that controls the slideshows of the photographic image data and enables communication between the tablet computers 216.

The server 70 controls the display devices 216 of the tablet computers 214 to present display screens with fields configured for entering user data and configured for delivering event data, or event organizer data to the users, such as described in FIGS. 3, 4, 5A, 5B, 5C, 5D, 5E and 6 herein.

The data is for ordering photos or sets of photos, for processing photographs or sets of photographs or otherwise communicating with an event organizer, photographer or videographer.

Besides still images, the slideshows of photographic image data may comprise video.

Furthermore, as described in FIGS. 3, 4, 5A, 5B, 5C, 5D, 5E and 6 herein, the server 70 of the interactive centerpiece system is connected to the Internet and enables communications by the tablet computers 214 over the Internet.

FIG. 8 discloses an alternate embodiment for an integral centerpiece box 310 at a lowered coffee table height above the floor, where the integral centerpiece box 310 comprises a pair of truncated four sided pyramids 310a and 310b joined at their respective large edges at a common joint 310c. Upper pyramid 310a is formed of docking stations 314 with frame walls 330 supporting tablet computers 316 therein. Tablet computers 316 are presented at respective oblique angles for viewing by users who are standing or sitting adjacent thereto, looking down at the display screens of tablet computers 316. Base 312 is presented horizontally above integral centerpiece box 310 for supporting decorative floral arrangements 5 thereon.

FIG. 9 presents a further alternate embodiment for an interactive media centerpiece 410 for a cocktail hour of a celebratory event, such as a wedding, which includes separate docking stations 414 supporting tablet computers 416 between support frames 430 and back walls 448. Each docking station 414 is cantilevered outward and connected by separate bracket arms 431 to upper pedestal 412a, which is elevated above base 412 for receiving glasses 460 and other flatware elements thereon. Upper pedestal 412a supports decorative floral arrangements 5 above docking stations 414, along a central axis of base 412. Lower pedestal 412b supports base 412, upper pedestal 412a and docking stations 414 with tablet computers 416, above the floor of the room where the celebrating event is taking place.

Although examples of the invention have been shown and described, it would be appreciated by those skilled in the art that changes may be made in these embodiments without departing from the principles and spirit of the invention, the scope of which is defined in the following claims and their equivalents.

What is claimed is:

1. An interactive centerpiece system, comprising:
   a plurality of tablet computers with interactive display devices for displaying slideshows of photographic image data; and
   a substantially flat base with opposing upper and lower surfaces, the base formed to lay flat on a table in a table position whereat a base central axis that is perpendicular to both the upper and lower surfaces substantially aligns with a geometric center of the table to surround a surface area defined by an outer perimeter about which the plurality of docking stations, into which one of the tablet computers is fixed, are arranged at equal distances from each other;
   wherein the docking stations are configured to face the interactive display devices outward and define a usable area between the docking stations and the base central axis for uses including receiving traditional event centerpieces;
   wherein the tablet computers receive and present photographic images, as a slideshow and respond to users inputs and commands for processing photos presented in the slideshow, including transmitting the photos and any processed photos realized by processing the photos;
   wherein the tablet computers are in electronic communication with a server that controls the slideshows of the photographic image data and enables communication between the tablet computers;
   wherein the server controls the display devices of the tablet computers to present display screens with fields configured for entering user data and configured for delivering event data, or event organizer data to the users;
   wherein the data is for ordering photos or sets of photos, for processing photographs or sets of photographs or otherwise communicating with an event organizer, photographer or videographer.

2. The interactive centerpiece system of claim 1, wherein the base further includes means for adjusting the outer perimeter and, therefore, the usable area; said means comprising said base having a plurality of docking stations having slits and nibs for size adjustment of said base.

3. The interactive centerpiece system of claim 1, wherein the outer perimeter is defined as any of the shapes of the group consisting of circular, square, rectangular, oval, ring-like and disc-like with radially-extending wings.

4. The interactive centerpiece system of claim 3, wherein the base is ring-like and there is no base material in a circular surface area defined between an inner ring boundary and the base central axis.

5. The interactive centerpiece system of claim 4, further comprising a centerpiece fixture configured to be positioned in the circular surface area.

6. The interactive centerpiece system of claim 1, wherein the docking stations comprise pedestals.

7. The interactive centerpiece system of claim 1, wherein the pedestals include connecting fasteners for connecting the tablet computers and a pedestal base attached to the base.

8. The interactive centerpiece system of claim 1, wherein the base is defined by an arrangement of 2 docking stations, 3 docking stations or 4 docking stations.

9. The interactive centerpiece system as set forth in claim 1, wherein the tablet computers are iPads.

10. The interactive centerpiece system as set forth in claim 1, wherein the base is made of plastic or polyvinyl.

11. The interactive centerpiece system as set forth in claim 1, wherein the slideshows of photographic image data comprise video.

12. The interactive centerpiece system as set forth in claim 1, wherein the server is connected to the Internet and enables communications by the tablet computers.

13. An interactive slideshow system that enables users to create a personal database from images captured at an event, the system comprising:
   a computer server;
   an image input device; and
   one or more interactive slideshow centerpieces for positioning at one or more respective tables at the event location, wherein each interactive slideshow centerpiece comprises:
      a plurality of tablet computers with interactive display devices for displaying slideshows of photographic image data in electrical communication with the computer server; and
      a substantially flat base with opposing upper and lower surfaces, the base formed to lay flat on a table in a table position whereat a base central axis that is perpendicular to both the upper and lower surfaces aligns with a geometric center of the table to surround a surface area defined by an outer perimeter about which the plurality of docking stations, into which one of the tablet computers is fixed, are arranged at substantially equal distances from each other;
   wherein the docking stations are configured to face the interactive display devices outward and define a usable area between the docking stations and the base central axis area for uses including receiving traditional event centerpieces; and
   wherein the computer server drives the interactive display devices of the tablet computers to present the slideshows and receive users inputs to process slideshow data therein and allow the users to communicate the slideshow data and processed slideshow data to other electronic devices wherein the tablet computers receive and present photographic images, as a slideshow and respond to users inputs and commands for processing photos presented in the slideshow, including transmitting the photos and any processed photos realized by processing the photos;

wherein the tablet computers are in electronic communication with a server that controls the slideshows of the photographic image data and enables communication between the tablet computers;

wherein the server controls the display devices of the tablet computers to present display screens with fields configured for entering user data and configured for delivering event data, or event organizer data to the users;

wherein the data is for ordering photos or sets of photos, for processing photographs or sets of photographs or otherwise communicating with an event organizer, photographer or videographer.

14. The interactive slideshow system of claim 13, wherein the outer perimeter is formed as a circular area defined by a radial distance to the base central axis.

15. The interactive slideshow system as set forth in claim 13, wherein the tablet computers present interactive display data that enables users to photo-edit the photographic images made available by the slideshow.

16. The interactive slideshow system as set forth in claim 13, wherein the computer server creates a personal database for each user.

17. The interactive slideshow system as set forth in claim 13, wherein the computer server creates a personal account for each user.

18. The interactive slideshow system as set forth in claim 13 further comprising a web-based browser, said web-based browser allowing a user to find and read encoded documents in a form suitable for display upon said tablet computers in conjunction with the Internet, said browser communicating wirelessly with each tablet computer; and, said web browser providing a platform for uploading of media appearing on said tablet computers of said interactive centerpiece.

* * * * *